United States Patent [19]

Bertolotti

[11] Patent Number: 4,800,792
[45] Date of Patent: Jan. 31, 1989

[54] CUTTING DEVICE FOR HOT GRANULATION OF THERMOPLASTIC POLYMERS

[75] Inventor: Franco Bertolotti, Milan, Italy
[73] Assignee: Montedison S.p.A., Italy
[21] Appl. No.: 33,857
[22] Filed: Apr. 6, 1987

Related U.S. Application Data

[63] Continuation of Ser. No. 742,271, Jun. 7, 1985, abandoned.

[30] Foreign Application Priority Data

Jun. 8, 1984 [IT] Italy .................. 21325 A/84

[51] Int. Cl.$^4$ .............................................. B26D 3/22
[52] U.S. Cl. ..................................... 83/356.3; 83/580; 83/582; 83/591; 83/913; 425/313
[58] Field of Search .................. 83/355, 356.3, 542, 83/580, 582, 583, 591, 913; 425/311–313

[56] References Cited

U.S. PATENT DOCUMENTS

| | | | |
|---|---|---|---|
| 2,745,490 | 5/1956 | Steiger et al. | 83/913 X |
| 2,990,741 | 7/1961 | Haase et al. | 83/583 X |
| 3,623,388 | 11/1971 | Gottling et al. | 83/582 |
| 3,867,081 | 2/1975 | Everett | 425/311 X |
| 4,009,629 | 3/1977 | Thomas et al. | 83/913 X |

FOREIGN PATENT DOCUMENTS

| | | | |
|---|---|---|---|
| 3126550 | 7/1982 | Fed. Rep. of Germany | 425/313 |
| 587850 | 5/1947 | United Kingdom | 83/913 |

*Primary Examiner*—Frank T. Yost
*Attorney, Agent, or Firm*—Stevens, Davis, Miller & Mosher

[57] ABSTRACT

A cutting device for the hot granulation of thermoplastic polymers including a rotary driving shaft, a blade-carrying disc rigidly keyed on the driving shaft and blades not rigidly mounted on said disc and sliding on the cutting plate, each blade being paired to an opposing element which opposes any sudden action tending to move the blade away from the plate.

This invention relates to a cutting device for the hot granulation of thermoplastic polymers.

More in particular, the present invention relates to a cutting device for the hot granulation of thermoplastic polymers, in which cutting of polymer monofilaments leaving the die plate is accomplished directly on the face of said die plate.

8 Claims, 2 Drawing Sheets

CUTTING DEVICE FOR HOT GRANULATION OF THERMOPLASTIC POLYMERS

BACKGROUND OF THE INVENTION

This application is a continuation of application Ser. No. 742,271, filed June 7, 1985, now abandoned.

The known devices for the hot granulation of thermoplastic materials generally comprise:
- (a) a die plate consisting of a heated drilled body;
- (b) a cutting device including a rotary driving shaft equipped with a blade-carrying disc and a system for positioning the blades against the outer face of the die plate;
- (c) a collecting chamber for the granules; and
- (d) a system for feeding and distributing the thermoregulated fluid, generally water, which is necessary to cool and carry the cut granules out of the collecting chamber.

The thermoplastic material in the molten state is extruded through the die plate holes; the monofilaments leaving the die plate are cut by the rotary blades and the resulting granules are cooled down and removed by the thermoregulated fluid.

The cutting device generally consists of a cutting plate consisting of the outer face of the die plate and of blades which are mounted on a blade-carrying disc keyed on the driving shaft, and are entrained in a rotary motion in front of the cutting plate, at a distance controlled by an axial shifting device.

Various hot cutting devices are known, which in practice, however, do not completely meet all the technological requirements Thus, for example, cutting devices with stiff blades integral with the driving shaft are known. In such devices, the regulation of the blades is difficult and not accurate due to the axial rigidity of the complex and, in practice, as no sufficient uniformity of behavior of the blades is achievable, the consequence thereof is a cut of bad quality and/or a severe wear of the cutting elements.

To overcome these drawbacks, cutting devices with elastic blades or with an axially sprung blade-carrying disc have been proposed.

Due to the sliding contact between the blades and the die plate face, a diffused wear occurs in these devices.

Furthermore, these known cutting devices are not suitable for use for all types of thermoplastic polymers. In fact, the devices having rigid blades are not suitable for relatively soft or low viscosity polymers because, since the blades have to be regulated in a position very near the die plate face, in practice there are some areas of irregular blades-plate contact and the wear is very intense.

On the other hand, the cutting devices equipped with elastic blades or with a sprung blade-carrying disc, are not suitable for use with polymers of relatively high viscosity and hardness because, since a high thrust of the blades against the die plate is required, they undergo rapid wear.

THE PRESENT INVENTION

An object of the present invention is to provide a cutting device for the hot granulation of thermoplastic polymers which does not exhibit the above-mentioned drawbacks.

More in particular, the object of the present invention is that of providing a cutting device for the hot granulation of all types of thermoplastic polymers A further object is that of providing a cutting device for the hot granulation of thermoplastic polymers in which the blades effect a sliding contact with the plate, and avoid severe wear of the parts.

Still another object of this invention is that of providing a cutting device for the hot granulation of thermoplastic polymers each blade of which behaves uniformly at any point of the cutting area.

I have now found that these and still other objects are achieved by a rotary driving shaft, a blade-carrying disc rigidly keyed on the driving shaft, and blades sliding on the cutting plate and not rigidly mounted on the blade-carrying disc, each blade being paired with an opposing element which opposes any sudden action tending to move the cutting edge of the blade away from the plate.

Preferably, the cutting edge of the blades should have a limited length in order to slide in continuous contact with the plate even in the case of irregular or buckled plates.

The blades, which slide on the plate, are capable of generating a cutting force the component of which directed in parallel to the face of the plate is effective and the component of which directed in perpendicular to said face is negligibly or not at all effective. To this purpose, the blades can be equipped with a flexible arm rigidly fixed to the blade-carrying disc, or with a rigid arm pivoted to said disc, or they can be applied to the blade-carrying disc by means of an axially sliding guiding joint.

The opposing element may be a mass, arranged within a proper guide of the blade-carrying disc and capable of transmitting to the blade a force of inertia with a component perpendicular to the plate face and directed against the same, such as, for example, a guided piston; or the opposing element may be a hydraulic shock absorber, an electromagnetic reaction system or an electronic control system of analogous effect, etc.

It is preferable to cause said opposing element to act in proximity of the end of the blade provided with the cutting edge in order to magnify the action thereof on the blade. This action exerted by the opposing element on the blade constitutes the cutting force component perpendicular to the plate.

The opposing element is equipped with a reset element which constantly restores the functionality thereof after each variation. Generally such reset element is a spring, an elastic element or a force of any kind, such as, for example, a hydraulic or electromagnetic force. The resetting force has the exclusive function of carrying the opposing element into contact with the blade again, and the blade into contact with the plate, while its thrusting action on the blade is practically negligible. That can be achieved by properly dimensioning and setting the complex formed by the opposing element and the resetting element, as a function of the type of polymer, of the blade speed, of the pitch and diameter of the plate holes and of the tribological characteristics of the blades and of the plate.

Thus, for example, in the case of polystyrene, with a diameter of the die plate holes ranging from 0.5 to 1.5 mm, with a pitch of 10–20 mm and with blades serving a single crown of holes, satisfactory results are obtained by using a mass of inertia of 0.5–1.5 kg, at a linear speed of the blades ranging from 1 to 10 m/s, and a spring set to have a reset force of 1–100 N.

The device forming the object of the present invention permits to attain best cutting conditions by pairing the possibility of a sliding contact with the plate and of an easy regulation typical of elastic blades, with the capability of exerting at the moment of the impact of the blade on the polymeric monofilament, a cutting action of intensity analogous with the one obtainable with rigid-blade devices, but with the advantage that the thrust of the cutting edge of the blade against the plate is practically absent. In this way, the influence of the thrust on the wear of the cutting elements is practically negligible and, in accordance with the tribology laws, it is possible to use, as compared to the known devices, construction materials having a lower hardness and/or higher blade speeds.

The cutting plate can be made of any rigid and hard material, such as steels, hardened, casehardened or nitrided steels, metals or alloys having a hardened surface layer obtained by chemical and/or thermal treatment, or by deposition of ceramic materials, such as chrome oxide or tungsten carbide etc., bronzes or wear-resistant alloys, and the like.

Blades can be made of the materials usually utilized for such purpose, such as for example treated and non-treated steels, with or without wear-resistant coating materials, brass, wear-resistant bronzes and the like.

The opposing element can be made of any metallic or non-metallic material, as long as the necessary mass of inertia is provided.

To facilitate the movement of the opposing element, the sliding seat thereof can be lined with brass, Teflon, graphite, etc., and/or it may be properly lubricated by water, oil, etc.

The constructive and functional characteristics of the cutting device according to the invention for the hot granulation of thermoplastic polymers can be better understood from the following detailed description, in which reference is made to the accompanying drawings showing some preferred embodiments, which are to be considered as an exemplification but not a limitation of the present invention, and in which.

In the Figures, like parts are indicated by the same reference numerals.

Figure 1:
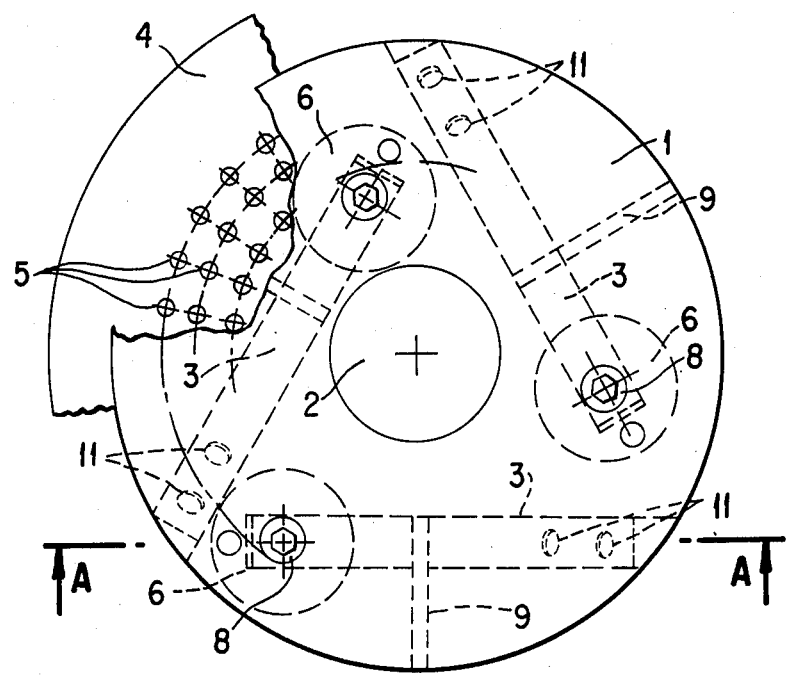
FIGS. 1A and 1B are, respective, a schematic plan view and a sectional view of one embodiment of the present invention.
Figure 1A:
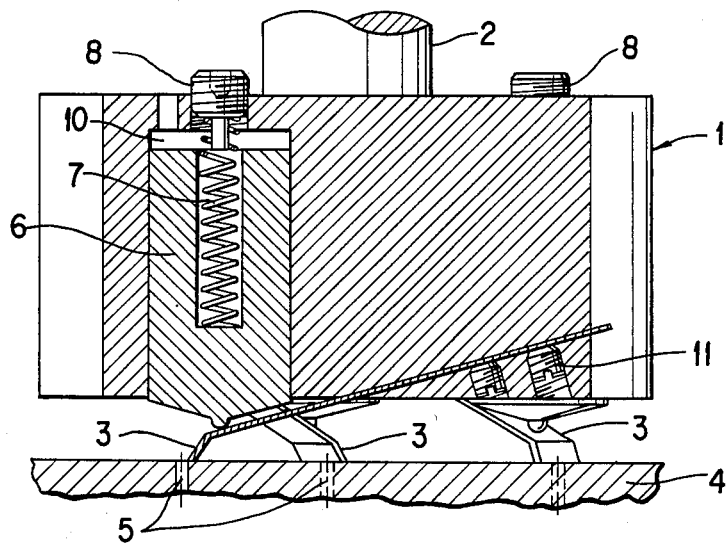

With reference FIGS. 1A and 1B, an embodiment of the cutting device for the hot granulation of thermoplastic polymers object of this invention comprises a cutting plate (4), provided with holes (5) for the polymer extrusion, in front of which a blade-carrying disc (1) keyed on the driving shaft (2) is arranged.

Blades (3) are applied to the blade-carrying disc (1), such blades being flexible and having low elasticity, so as to exert against the face of the plate (4) a thrust which is negligible with regard both to the cutting and to the wear of the sliding parts.

Each blade (3) is fixed within a proper seat (9) of the blade-carrying disc (1) by means of fastening screws (11). The cutting edge of the blades (3) has a limited length in order to intersect polymer monofilaments extruding from a single crown of extrusion holes (5). An opposing element consisting of a piston (6) arranged in a seat (10) machined in the bladecarrying carrying disc (1) acts in proximity of the free end of blade (3). Said piston (6) can slide within the seat (10), perpendicularly to plate (4), as a consequence of any variation of position of blade (3) and of a resetting spring (7). This resetting spring (7) is arranged in a seat machined in piston (6) and is opposed by an adjusting screw (8) screwed on the blade-carrying disc (1).

During operation of the device, upon impact of blade (3) against the polymeric monofilament issuing from extrusion hole (5), the blade undergoes a thrust with components respectively parallel and perpendicular to the face of plate (4).

The parallel component is effectively opposed by the mechanical strength of the blade, while the perpendicular component is opposed by the force of inertia of the piston (6). Therefore, the mass of piston (6) is dimensioned as a function of the required cutting force.

Resetting spring (7) of piston (6) is set by means of screw (8) in such a manner that the reset of the working position of piston (6) occurs before the blade reaches the successive extrusion hole and its thrust on the blade (3) is negligible with regard to wear.

Figure 2:
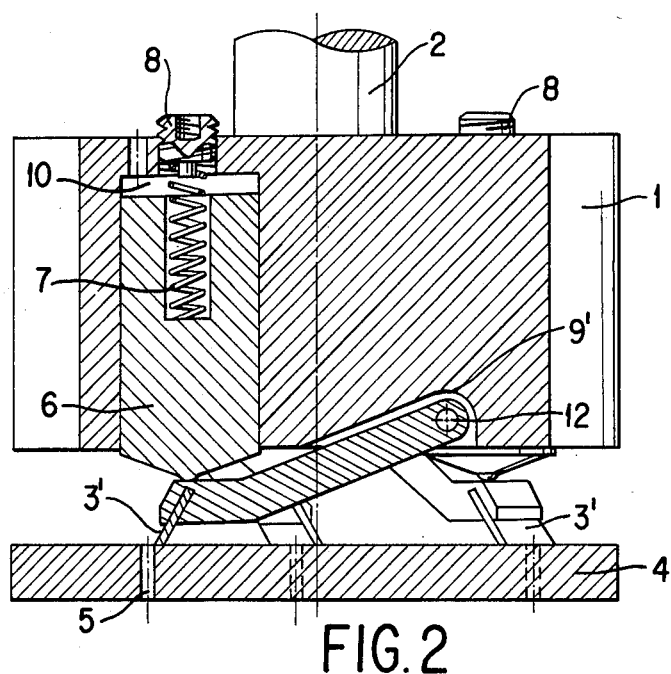
FIG. 2 is a sectional view of an alternative embodiment of the invention.

The embodiment illustrated in FIG. 2 differs from that of FIGS. 1A and 1B because blades (3') are stiff and pivoted, at the end opposed to the cutting end, in a proper seat (9') of the blade-carrying disc (1) by means of a pin (12).

Figure 3:
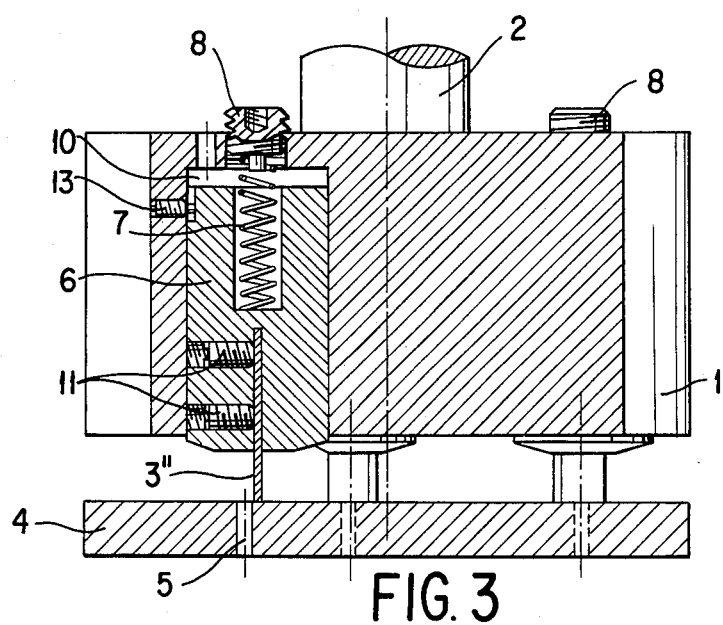
FIG. 3 is a sectional view of another alternative embodiment of the invention.

In the embodiment illustrated in FIG. 3, blades (3") are stiff and directly applied to piston (6) by means of fastening screws (11). In such embodiment, piston (6) acts also as a joint between blade (3") and blade-carrying disc (1).

With a view to preventing the rotation of piston (6) around its axis, a guiding element (13) is provided. The positioning of the guide (13) permits also to change the orientation of the cutting edge of blade (3").

Blades (3") may be of the straight cut-off type, or may be inclined on the plate, in order to accomplish the knife-type cut, either by suitably shaping them or by arranging the piston (6) with the sliding axis oblique to the face of cutting plate (4).

In the practical embodiment of the present invention, various changes, modifications and variations may be made in the various parts forming the cutting devices illustrated, by way of example, in the Figures of the annexed drawings, within the spirit of the invention and without departing from the scope thereof.

I claim:

1. A cutting device for hot granulation of thermoplastic polymers, comprising a rotary driving shaft, a blade-carrying disc rigidly keyed on the driving shaft and blades mounted on the blade-carrying disc and sliding on a cutting plate, wherein each blade includes a flexible arm rigidly fixed to said blade-carrying disc wherein each blade has an end equipped with a cutting edge which is coupled to a movable opposing element which is arranged in a guide of said blade-carrying disc and which opposes every sudden variation tending to move the cutting edge of the blade away from the plate by a force of inertia with a component perpendicular to the face of the plate and directed against the same.

2. A cutting device for hot granulation of thermoplastic polymers according to claim 1, characterized in that the opposing element is equipped with a resetting element which constantly restores the functionality thereof after each variation.

3. A cutting device for hot granulation of thermoplastic polymers according to claim 2, in which the resetting element is a spring.

4. A cutting device for hot granulation of thermoplastic polymers according to claim 1, characterized in that the cutting blades have such a cutting edge length as to intersect polymer monofilaments being extruded through a single crown of extrusion holes.

5. A cutting device for hot granulation of thermoplastic polymers, comprising a rotary driving shaft, a blade-carrying disc rigidly keyed on the driving shaft, and a plurality of blades mounted on the blade-carrying disc and sliding on a cutting plate, wherein each blade is mounted to the blade-carrying disc by means of a joint which is axially slidable in a guide arranged in the blade-carrying disc and which opposes every sudden variation tending to move the cutting edge of the blade away from the plate by a force of inertia with a component perpendicular to the face of the plate and directed against the same.

6. A cutting device for hot granulation of thermoplastic polymers, comprising a rotary driving shaft, a blade-carrying disc rigidly keyed on the driving shaft and blades mounted on the blade-carrying disc and sliding on a cutting plate, wherein each blade includes a rigid arm pivoted to said blade-carrying disc, wherein each blade has an end equipped with a cutting edge which is coupled to a movable opposing element which is arranged in a guide of said bladecarrying disc and which opposes every sudden variation tending to move the cutting edge of the blade away from the plate by a force of inertia with a component perpendicular to the face of the plate and directed against the same.

7. A cutting device for hot granulation of thermoplastic polymers according to claim 6, characterized in that the opposing element is equipped with a resetting element which constantly restores the functionality thereof after each variation.

8. A cutting device for hot granulation of thermoplastic polymers according to claim 6, in which the resetting element is a spring.

* * * * *